(12) United States Patent
Yamamoto

(10) Patent No.: US 7,636,205 B2
(45) Date of Patent: Dec. 22, 2009

(54) WIDE-ANGLE IMAGING LENS

(75) Inventor: Yoko Yamamoto, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 166 days.

(21) Appl. No.: 11/802,864

(22) Filed: May 25, 2007

(65) Prior Publication Data
US 2007/0279761 A1 Dec. 6, 2007

(30) Foreign Application Priority Data
May 31, 2006 (JP) ............................ P2006-151781

(51) Int. Cl.
*G02B 9/34* (2006.01)
(52) U.S. Cl. ...................... 359/781; 359/740
(58) Field of Classification Search ......... 359/738–740, 359/761, 770, 781
See application file for complete search history.

(56) References Cited
U.S. PATENT DOCUMENTS

| 6,233,099 | B1 | 5/2001 | Itoh |
| 2003/0189761 | A1 | 10/2003 | Park |
| 2004/0257677 | A1 | 12/2004 | Matsusaka |

FOREIGN PATENT DOCUMENTS

| JP | 5-264895 A | 10/1993 |
| JP | 406061710 A | * 8/1995 |
| JP | 9-61710 A | 3/1997 |
| JP | 10-39207 A | 2/1998 |
| JP | 3437004 B2 | 6/2003 |

* cited by examiner

*Primary Examiner*—Joseph Martinez
(74) *Attorney, Agent, or Firm*—Birch, Stewart, Kolasch & Birch, LLP

(57) ABSTRACT

A wide-angle imaging lens comprises, in order from an object:
  a first lens having a negative refractive power;
  a second lens having a positive refractive power with a convex face directed to the object;
  an aperture diaphragm;
  a third lens having a positive refractive power with a convex face directed to an image; and
  a fourth lens having a positive refractive power with a convex face directed to the object,
wherein the following conditional expressions are satisfied.

$N2 \geq 1.7$ (1)

$N3 \geq 1.7$ (2)

$N4 \geq 1.7$ (3)

when
  N2: a refractive index of the second lens at the d-line
  N3: a refractive index of the third lens at the d-line
  N4: a refractive index of the fourth lens at the d-line.

16 Claims, 13 Drawing Sheets

ARRANGEMENT 1 (EXAMPLE 1)

ARRANGEMENT 1 (EXAMPLE 1)

ARRANGEMENT 2 (EXAMPLE 5)

ARRANGEMENT 3 (EXAMPLE 10)

| EXAMPLE 1: BASIC LENS DATA ||||||
|---|---|---|---|---|---|
| | Si (SURFACE NUMBER) | Ri (RADIUS CURVATURE) | Di (SURFACE SPACE) | Ndj (REFRACTIVE INDEX) | νdj (ABBE NUMBER) |
| G1 | 1 | −14.630 | 0.65 | 1.56883 | 56.3 |
| | 2 | 12.251 | 0.20 | | |
| G2 | 3 | 5.013 | 1.60 | 1.84666 | 23.8 |
| | 4 | −75.423 | 0.36 | | |
| | 5 | (DIAPHRAM) | 0.22 | | |
| G3 | 6 | −3.071 | 1.82 | 1.83481 | 42.7 |
| | 7 | −3.001 | 0.15 | | |
| G4 | 8 | 4.810 | 1.92 | 1.83481 | 42.7 |
| | 9 | 12.774 | 2.01 | | |
| CG | 10 | ∞ | 0.50 | 1.51680 | 64.2 |
| | 11 | ∞ | | | |

FIG. 5

| | | EXAMPLE 2: BASIC LENS DATA | | | |
|---|---|---|---|---|---|
| | Si (SURFACE NUMBER) | Ri (RADIUS CURVATURE) | Di (SURFACE SPACE) | Ndj (REFRACTIVE INDEX) | vdj (ABBE NUMBER) |
| G1 | 1 | −11.182 | 0.65 | 1.56883 | 56.3 |
| G1 | 2 | 9.794 | 0.20 | | |
| G2 | 3 | 4.068 | 1.60 | 1.84666 | 23.8 |
| G2 | 4 | −405.631 | 0.30 | | |
| | 5 | (DIAPHRAM) | 0.18 | | |
| G3 | 6 | −3.001 | 1.50 | 1.83481 | 42.7 |
| G3 | 7 | −3.001 | 0.15 | | |
| G4 | 8 | 4.939 | 1.85 | 1.83481 | 42.7 |
| G4 | 9 | 17.674 | 2.01 | | |
| CG | 10 | ∞ | 0.50 | 1.51680 | 64.2 |
| CG | 11 | ∞ | | | |

FIG. 6

| | | EXAMPLE 3: BASIC LENS DATA | | | |
|---|---|---|---|---|---|
| | Si (SURFACE NUMBER) | Ri (RADIUS CURVATURE) | Di (SURFACE SPACE) | Ndj (REFRACTIVE INDEX) | vdj (ABBE NUMBER) |
| G1 | 1 | −27.070 | 0.65 | 1.51680 | 64.2 |
| G1 | 2 | 5.438 | 0.63 | | |
| G2 | 3 | 3.624 | 1.60 | 1.84666 | 23.8 |
| G2 | 4 | 20.355 | 0.46 | | |
| | 5 | (DIAPHRAM) | 0.21 | | |
| G3 | 6 | −3.001 | 1.50 | 1.83481 | 42.7 |
| G3 | 7 | −3.001 | 0.15 | | |
| G4 | 8 | 5.025 | 1.94 | 1.83481 | 42.7 |
| G4 | 9 | 28.999 | 2.00 | | |
| CG | 10 | ∞ | 0.50 | 1.51680 | 64.2 |
| CG | 11 | ∞ | | | |

FIG. 7

| | EXAMPLE 4: BASIC LENS DATA | | | | |
|---|---|---|---|---|---|
| | Si (SURFACE NUMBER) | Ri (RADIUS CURVATURE) | Di (SURFACE SPACE) | Ndj (REFRACTIVE INDEX) | νdj (ABBE NUMBER) |
| G1 | 1 | −15.536 | 1.14 | 1.51680 | 64.2 |
| | 2 | 8.223 | 0.20 | | |
| G2 | 3 | 4.081 | 1.60 | 1.84666 | 23.8 |
| | 4 | 60.086 | 0.34 | | |
| | 5 | (DIAPHRAM) | 0.22 | | |
| G3 | 6 | −3.001 | 1.50 | 1.83481 | 42.7 |
| | 7 | −3.001 | 0.15 | | |
| G4 | 8 | 4.994 | 1.81 | 1.83481 | 42.7 |
| | 9 | 24.141 | 2.01 | | |
| CG | 10 | ∞ | 0.50 | 1.51680 | 64.2 |
| | 11 | ∞ | | | |

FIG. 8

| | EXAMPLE 5: BASIC LENS DATA | | | | |
|---|---|---|---|---|---|
| | Si (SURFACE NUMBER) | Ri (RADIUS CURVATURE) | Di (SURFACE SPACE) | Ndj (REFRACTIVE INDEX) | νdj (ABBE NUMBER) |
| G1 | 1 | −16.248 | 0.65 | 1.51680 | 64.2 |
| | 2 | −766.649 | 0.20 | | |
| G2 | 3 | 7.075 | 1.60 | 1.84666 | 23.8 |
| | 4 | 33.508 | 0.10 | | |
| | 5 | (DIAPHRAM) | 0.18 | | |
| G3 | 6 | −3.001 | 1.89 | 1.83481 | 42.7 |
| | 7 | −3.001 | 0.15 | | |
| G4 | 8 | 5.122 | 1.60 | 1.83481 | 42.7 |
| | 9 | 29.165 | 2.57 | | |
| CG | 10 | ∞ | 0.50 | 1.51680 | 64.2 |
| | 11 | ∞ | | | |

FIG. 9

| | EXAMPLE 6: BASIC LENS DATA | | | | |
|---|---|---|---|---|---|
| | Si (SURFACE NUMBER) | Ri (RADIUS CURVATURE) | Di (SURFACE SPACE) | Ndj (REFRACTIVE INDEX) | νdj (ABBE NUMBER) |
| G1 | 1 | −12.931 | 1.04 | 1.51680 | 64.2 |
| | 2 | 68.948 | 0.20 | | |
| G2 | 3 | 4.808 | 1.60 | 1.80810 | 22.8 |
| | 4 | 23.292 | 0.10 | | |
| | 5 | (DIAPHRAM) | 0.21 | | |
| G3 | 6 | −3.618 | 2.04 | 1.83481 | 42.7 |
| | 7 | −3.001 | 0.15 | | |
| G4 | 8 | 4.345 | 1.60 | 1.83481 | 42.7 |
| | 9 | 6.640 | 1.99 | | |
| CG | 10 | ∞ | 0.50 | 1.51680 | 64.2 |
| | 11 | ∞ | | | |

FIG. 10

| | EXAMPLE 7: BASIC LENS DATA | | | | |
|---|---|---|---|---|---|
| | Si (SURFACE NUMBER) | Ri (RADIUS CURVATURE) | Di (SURFACE SPACE) | Ndj (REFRACTIVE INDEX) | νdj (ABBE NUMBER) |
| G1 | 1 | −21.235 | 0.65 | 1.51680 | 64.2 |
| | 2 | 5.773 | 0.35 | | |
| G2 | 3 | 3.875 | 1.60 | 1.80810 | 22.8 |
| | 4 | 107.537 | 0.39 | | |
| | 5 | (DIAPHRAM) | 0.22 | | |
| G3 | 6 | −3.001 | 1.71 | 1.83481 | 42.7 |
| | 7 | −3.001 | 0.15 | | |
| G4 | 8 | 4.942 | 1.99 | 1.83481 | 42.7 |
| | 9 | 18.409 | 2.00 | | |
| CG | 10 | ∞ | 0.50 | 1.51680 | 64.2 |
| | 11 | ∞ | | | |

FIG. 11

| EXAMPLE 8: BASIC LENS DATA | | | | |
|---|---|---|---|---|
| Si (SURFACE NUMBER) | Ri (RADIUS CURVATURE) | Di (SURFACE SPACE) | Ndj (REFRACTIVE INDEX) | vdj (ABBE NUMBER) |
| G1: 1 | −9.890 | 0.65 | 1.51680 | 64.2 |
| G1: 2 | 10.930 | 0.20 | | |
| G2: 3 | 4.871 | 1.60 | 1.84666 | 23.8 |
| G2: 4 | −39.880 | 0.31 | | |
| 5 | (DIAPHRAM) | 0.18 | | |
| G3: 6 | −3.001 | 1.70 | 1.81600 | 46.6 |
| G3: 7 | −3.001 | 0.15 | | |
| G4: 8 | 4.911 | 1.60 | 1.81600 | 46.6 |
| G4: 9 | 15.899 | 2.36 | | |
| CG: 10 | ∞ | 0.50 | 1.51680 | 64.2 |
| CG: 11 | ∞ | | | |

FIG. 12

| EXAMPLE 9: BASIC LENS DATA | | | | |
|---|---|---|---|---|
| Si (SURFACE NUMBER) | Ri (RADIUS CURVATURE) | Di (SURFACE SPACE) | Ndj (REFRACTIVE INDEX) | vdj (ABBE NUMBER) |
| G1: 1 | −13.613 | 0.65 | 1.51680 | 64.2 |
| G1: 2 | 10.592 | 0.20 | | |
| G2: 3 | 5.134 | 1.60 | 1.84666 | 23.8 |
| G2: 4 | −46.430 | 0.43 | | |
| 5 | (DIAPHRAM) | 0.21 | | |
| G3: 6 | −3.001 | 1.79 | 1.81600 | 46.6 |
| G3: 7 | −3.001 | 0.15 | | |
| G4: 8 | 4.918 | 1.60 | 1.81600 | 46.6 |
| G4: 9 | 20.181 | 2.24 | | |
| CG: 10 | ∞ | 0.50 | 1.51680 | 64.2 |
| CG: 11 | ∞ | | | |

FIG. 13

| EXAMPLE 10: BASIC LENS DATA ||||||
|---|---|---|---|---|---|
| | Si (SURFACE NUMBER) | Ri (RADIUS CURVATURE) | Di (SURFACE SPACE) | Ndj (REFRACTIVE INDEX) | vdj (ABBE NUMBER) |
| G1 | 1 | 105.835 | 0.65 | 1.51680 | 64.2 |
| | 2 | 3.627 | 0.55 | | |
| G2 | 3 | 3.507 | 1.60 | 1.84666 | 23.8 |
| | 4 | 19.753 | 0.46 | | |
| | 5 | (DIAPHRAM) | 0.21 | | |
| G3 | 6 | -3.223 | 1.77 | 1.81600 | 46.6 |
| | 7 | -3.001 | 0.15 | | |
| G4 | 8 | 4.928 | 2.02 | 1.81600 | 46.6 |
| | 9 | 20.812 | 2.00 | | |
| CG | 10 | ∞ | 0.50 | 1.51680 | 64.2 |
| | 11 | ∞ | | | |

FIG. 14

| | ENTIRE FOCAL LENGTH f | FNo. | ANGLE OF VIEW 2ω |
|---|---|---|---|
| EXAMPLE 1 | 3.58 | 2.4 | 99.7 |
| EXAMPLE 2 | 3.59 | 2.4 | 99.9 |
| EXAMPLE 3 | 3.57 | 2.4 | 99.6 |
| EXAMPLE 4 | 3.58 | 2.4 | 99.9 |
| EXAMPLE 5 | 3.59 | 2.4 | 99.5 |
| EXAMPLE 6 | 3.55 | 2.4 | 100.2 |
| EXAMPLE 7 | 3.57 | 2.4 | 99.5 |
| EXAMPLE 8 | 3.61 | 2.4 | 99.8 |
| EXAMPLE 9 | 3.58 | 2.4 | 99.6 |
| EXAMPLE 10 | 3.52 | 2.4 | 98.0 |

FIG. 15
| | CONDITIONAL EXPRESSION | | | | | | |
|---|---|---|---|---|---|---|---|
| | EXPRESSION (1) | EXPRESSION (2) | EXPRESSION (3) | EXPRESSION (4) | EXPRESSION (5) | EXPRESSION (6) | EXPRESSION (7) |
| EXAMPLE 1 | 1.84666 | 1.83481 | 1.83481 | 0.16 | 0.29 | 0.43 | -0.24 |
| EXAMPLE 2 | 1.84666 | 1.83481 | 1.83481 | 0.13 | 0.23 | 0.47 | -0.32 |
| EXAMPLE 3 | 1.84666 | 1.83481 | 1.83481 | 0.19 | 0.23 | 0.51 | -0.13 |
| EXAMPLE 4 | 1.84666 | 1.83481 | 1.83481 | 0.15 | 0.23 | 0.50 | -0.23 |
| EXAMPLE 5 | 1.84666 | 1.83481 | 1.83481 | 0.08 | 0.29 | 0.50 | -0.22 |
| EXAMPLE 6 | 1.80810 | 1.83481 | 1.83481 | 0.06 | 0.42 | 0.31 | -0.27 |
| EXAMPLE 7 | 1.80810 | 1.83481 | 1.83481 | 0.17 | 0.26 | 0.47 | -0.17 |
| EXAMPLE 8 | 1.84666 | 1.81600 | 1.81600 | 0.11 | 0.25 | 0.44 | -0.36 |
| EXAMPLE 9 | 1.84666 | 1.81600 | 1.81600 | 0.18 | 0.26 | 0.47 | -0.26 |
| EXAMPLE 10 | 1.84666 | 1.81600 | 1.81600 | 0.19 | 0.30 | 0.47 | 0.03 |
EXAMPLE 1
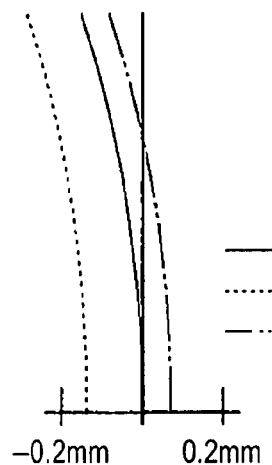
FNO. = 2.40
— e-LINE
······· g-LINE
—·— C-LINE
-0.2mm    0.2mm
SPHERICAL ABERRATION
FIG. 16A
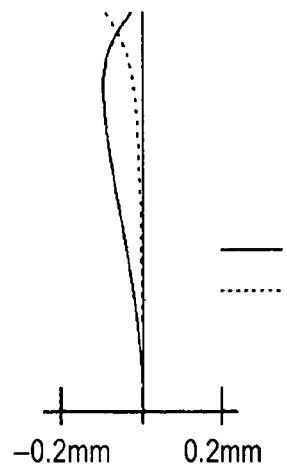
ω = 49.9°
— SAGITTAL
······· TANGENTIAL
-0.2mm    0.2mm
ASTIGMATISM
FIG. 16B
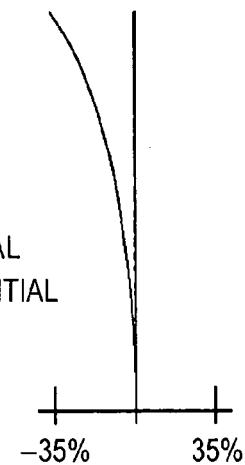
ω = 49.9°
-35%    35%
DISTORTION
FIG. 16C EXAMPLE 2
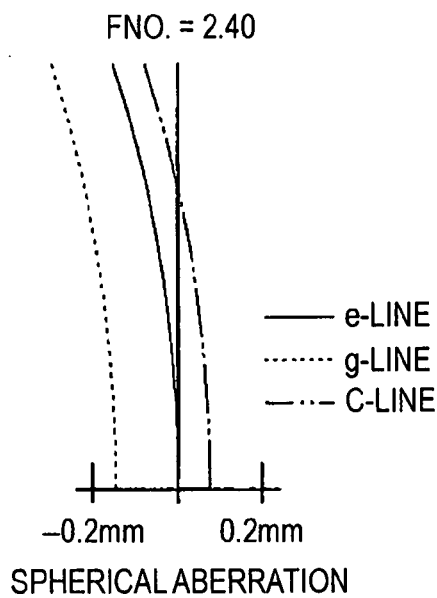
FIG. 17A
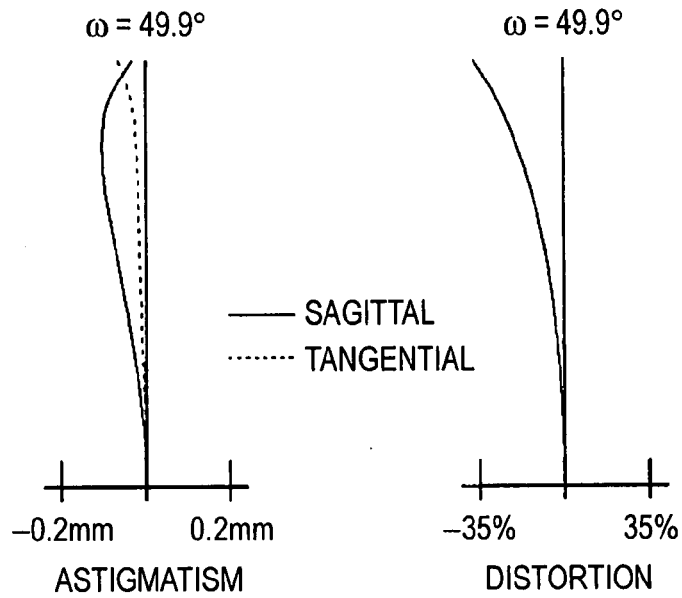
FIG. 17B
FIG. 17C
EXAMPLE 3
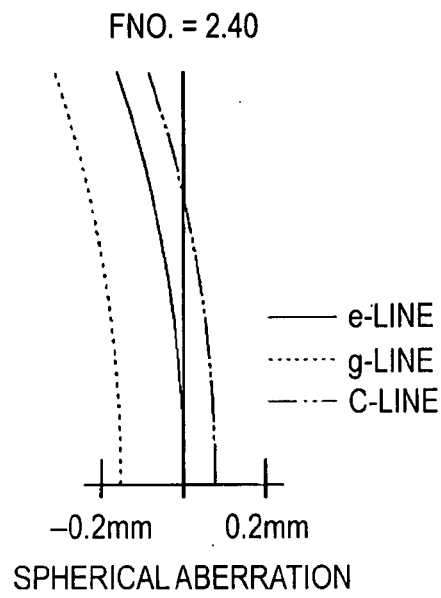
FIG. 18A
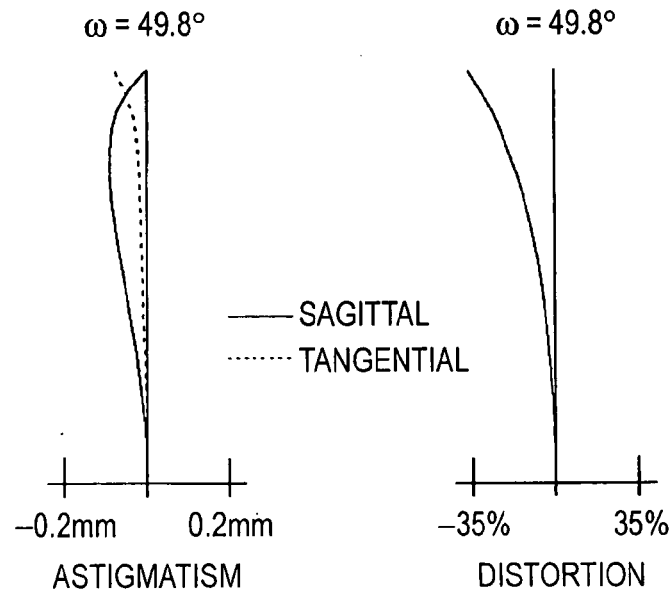
FIG. 18B
FIG. 18C

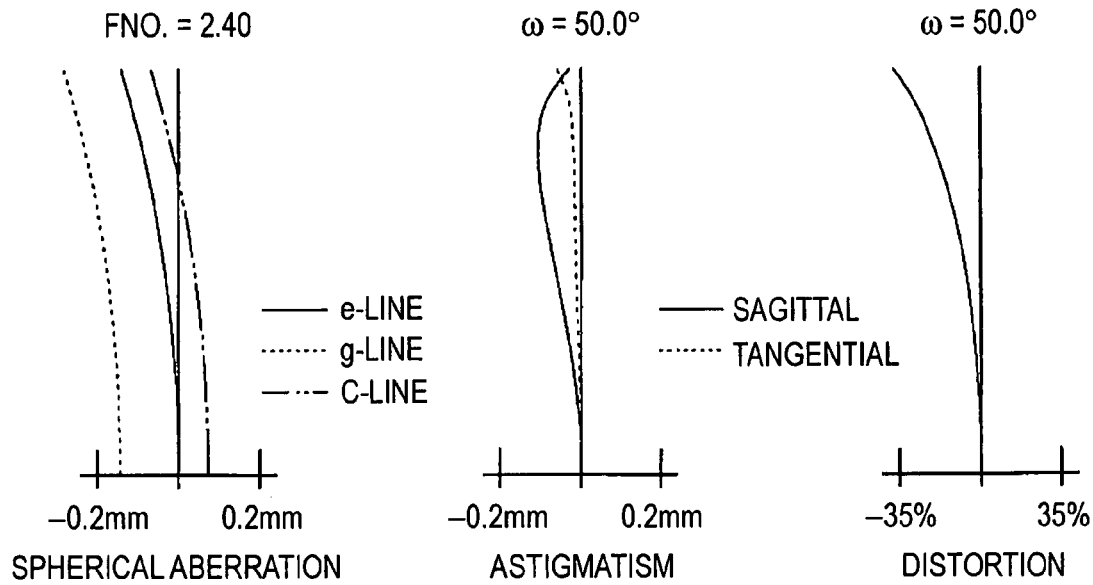
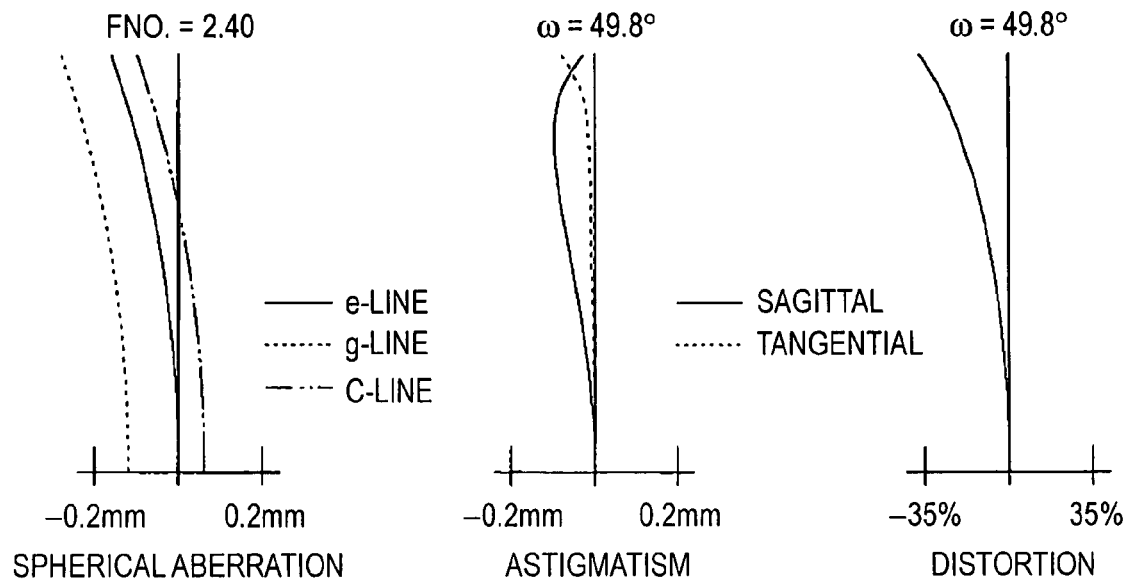

EXAMPLE 6

EXAMPLE 7

EXAMPLE 8

EXAMPLE 9

EXAMPLE 10

WIDE-ANGLE IMAGING LENS

BACKGROUND OF THE INVENTION

1. Field of the Invention

The present invention relates to a wide-angle imaging lens appropriate for a small, image pickup apparatus, such as a monitoring camera or a vehicular camera.

2. Description of the Related Art

Image pickup apparatuses, digital still cameras and video cameras that employ image sensors such as CCDs (Charge Coupled Devices) or CMOSs (Complementary Metal Oxide Semiconductors), have become popular, and accompanying this popularity is an ever growing demand for apparatuses that are smaller and less expensive, yet provide improved performance. Further, especially desired, for vehicular cameras and area monitoring cameras, are wide-angle lenses that provide a broad viewing range. Also, because of limitations imposed by the availability of installation sites and the environments in which lenses are to be used, lenses that are in great demand are those that are little affected, while in use, by temperature variations (those lenses for which the number of temperature induced optical performance changes, such as altered focal points, is extremely small).

In JP-A-5-264895, JP-A-10-39207 and Japanese Patent No. 3,437,004, disclosed are lens each comprising a comparatively small number of lenses, i.e., with a four-component, four-element construction, to be mounted, for example, on a monitoring camera. For the lens described in these references, first of all, a first lens having a negative refractive power is located nearest an object to provide a retrofocus type arrangement. Thus, a comparatively long backfocus distance is obtained for the arrangement of a lowpass filter or an infrared cut filter. More specifically, for the lens in JP-A-5-264895 and JP-A-10-39207, negative, positive, positive and negative lenses are arranged in order, near an object, and for the lens in Japanese Patent No. 3,437,004, negative, positive, positive and positive lenses are arranged in order, near an object. Further, according to the example in Japanese Patent No. 3,437,004, the third and fourth lenses are plastic, and the face of at least one of these lenses is aspherical.

However, when plastic lenses are employed, as in Japanese Patent No. 3,437,004, an adverse effect may be produced by temperature fluctuation while the lenses are in use (a temperature fluctuation may produce a change in the optical performance, such as an altered focal point) or the lenses may be adversely affected by the environment in which they are stored (their shapes may be changed by a load imposed under high temperature). Therefore, while taking into account temperature fluctuations during use and storage environments, glass lenses are preferable. In the event, however, were an aspherical lens to be employed as in Japanese Patent No. 3,437,004, a molded, aspherical glass lens would be required, and the cost would be increased. And since only spherical glass lenses are employed in JP-A-5-264895 and JP-A-10-39207, the price would be lower, compared with when a molded, aspherical glass lens is employed. However, the lens arrangement used in both JP-A-5-264895 and JP-A-10-39207 is not appropriate for a reduction in the size of an image pickup apparatus, because using the lenses to obtain an appropriate backfocus extension is one of the objectives. The lens described in JP-A-5-264895 is especially not appropriate, because the total length of the lens is so great relative to the angle of view, near 90°, that is obtained. The lens in JP-A-10-39207 provides an angle of view of only about 60°, and while the overall length is comparatively short, the lens is not a satisfactory means for increasing the angle of view. As for the lens described in Japanese Patent No. 3,437,004, not only is there a problem associated with the cost of the lens material, but also the angle of view is only about 64°, and is not, therefore, a satisfactory means for increasing the angle of view. Moreover, according to JP-A-5-264895, JP-A-10-39207 and Japanese Patent No. 3,437,004, the space between the second lens and the third lens is comparatively large, and this is also an unfavorable condition for the downsizing of an apparatus.

SUMMARY OF THE INVENTION

While taking these problems into account, one objective of the present invention is to provide a wide-angle imaging lens that requires only a comparatively small number of lenses to reduce the overall length of the lens, and to obtain an angle of view equal to or greater than 90° (e.g., around 100°).

According to the present invention, a wide-angle imaging lens comprises, in order from an object:

a first lens having a negative refractive power;

a second lens having a positive refractive power with a convex face directed to the object;

an aperture diaphragm;

a third lens having a positive refractive power with a convex face directed to an image; and a fourth lens having a positive refractive power with a convex face directed to the object, wherein the following conditional expressions are satisfied. It should be noted that N2 denotes the refractive index of the second lens at the d-line, N3 denotes the refractive index of the third lens at the d-line, and N4 denotes the refractive index of the fourth lens at the d-line.

$$N2 \geq 1.7 \qquad (1)$$

$$N3 \geq 1.7 \qquad (2)$$

$$N4 \geq 1.7 \qquad (3)$$

For the wide-angle imaging lens of this invention, only a comparatively small number of lenses, i.e., with a four-component, four-element construction, is employed to optimize the power arrangement and the lens material, and can be downsized and a wide angle of view obtained. Especially, since the first lens located nearest the object is a negative lens, this is a favorable arrangement for an increase in the angle of view, and since positive lenses are employed for all the sequential second to fourth lenses, this arrangement can reduce the total length of the lens, and is favorable for downsizing. Further, when conditional expressions (1) to (3) are satisfied, the angle of view can be increased, and an inexpensive arrangement can be easily provided wherein spherical glass lenses, for example, are employed for the entire lens.

Further, in this invention, the second preferable condition for the wide-angle imaging lens is satisfactorily employed in accordance, for example, with a requested specification. Thus, downsizing and an increase in the angle of view can be easily accomplished.

For the wide-angle imaging lens of this invention, it is preferable that the third lens has a meniscus shape with a convex face directed to the image, and that the fourth lens has a meniscus shape with a convex face directed to the object. This arrangement is a favorable one for the correction, for example, of a field curvature.

Furthermore, it is preferable that the following conditional expression (4) be satisfied. Therefore, the space between the second lens and the third lens is optimized, and the resultant arrangement is useful for the correction of individual aberrations, and for a reduction in the entire length of the lens. Here, D23 denotes a spatial distance between the second lens and the third lens.

$$0.03 < D23/f < 0.22 \quad (4)$$

Further, it is preferable that the following conditional expressions (5) to (7) be satisfied. Thus, the refractive powers of the third lens and the fourth lens are optimized, the form of the first lens is optimized, and the individual aberrations are appropriately corrected. It should be noted that f denotes the entire focal length of the imaging lens, f3 denotes the focal length of the third lens, f4 denotes the focal length of the fourth lens, and R1 denotes the radius of the curvature of the first lens on the object side.

$$0.18 < f/f3 < 0.46 \quad (5)$$

$$0.27 < f/f4 < 0.58 \quad (6)$$

$$-0.44 < f/R1 < 0.11 \quad (7)$$

Also, for the wide-angle imaging lens of this invention, it is preferable that the first lens, the second lens, the third lens and the fourth lens all be glass lenses. Thus, compared with an arrangement that employs a plastic lens, this arrangement is adversely affected very little by temperature fluctuation during use, or by storage environments, and provides appropriately efficient service when mounted on a vehicular camera or a monitoring camera. Especially, in order to provide an inexpensive arrangement, it is preferable that spherical glass lenses be employed for the entire lens. When only spherical glass lenses are employed, the price can be lowered compared with when a molded, aspherical glass lens is employed.

BRIEF DESCRIPTION OF THE DRAWINGS

FIG. 5 is a table showing basic lens data for a wide-angle imaging lens according to example 2 of the present invention;

FIG. 6 is a table showing basic lens data for the wide-angle imaging lens according to example 3 of the present invention;

FIG. 7 is a table showing basic lens data for a wide-angle imaging lens according to example 4 of the present invention;

FIG. 8 is a table showing basic lens data for the wide-angle imaging lens according to example 5 of the present invention;

FIG. 9 is a table showing basic lens data for a wide-angle imaging lens according to example 6 of the present invention;

FIG. 10 is a table showing basic lens data for a wide-angle imaging lens according to example 7 of the present invention;

FIG. 11 is a table showing basic lens data for a wide-angle imaging lens according to example 8 of the present invention;

FIG. 12 is a table showing basic lens data for a wide-angle imaging lens according to example 9 of the present invention;

FIG. 13 is a table showing basic lens data for a wide-angle imaging lens according to example 10 of the present invention;

FIG. 14 is a table showing the focal length of the entire lens system, an F number and an angle of view for the individual examples;

FIG. 15 is a table showing values for the individual examples related to conditional expressions;

FIGS. 16A to 16C are graphs showing a spherical aberration, astigmatism and distortion, respectively, for the wide-angle imaging lens according to example 1 of the present invention;

FIGS. 17A to 17C are graphs showing a spherical aberration, astigmatism and distortion, respectively, for the wide-angle imaging lens according to example 2 of the present invention;

FIGS. 18A to 18C are graphs showing a spherical aberration, astigmatism and distortion, respectively, for the wide-angle imaging lens according to example 3 of the present invention;

FIGS. 19A to 19C are graphs showing a spherical aberration, astigmatism and distortion, respectively, for the wide-angle imaging lens according to example 4 of the present invention;

FIGS. 20A to 20C are graphs showing a spherical aberration, astigmatism and distortion, respectively, for the wide-angle imaging lens according to example 5 of the present invention;

DETAILED DESCRIPTION OF THE INVENTION

Figure 1:
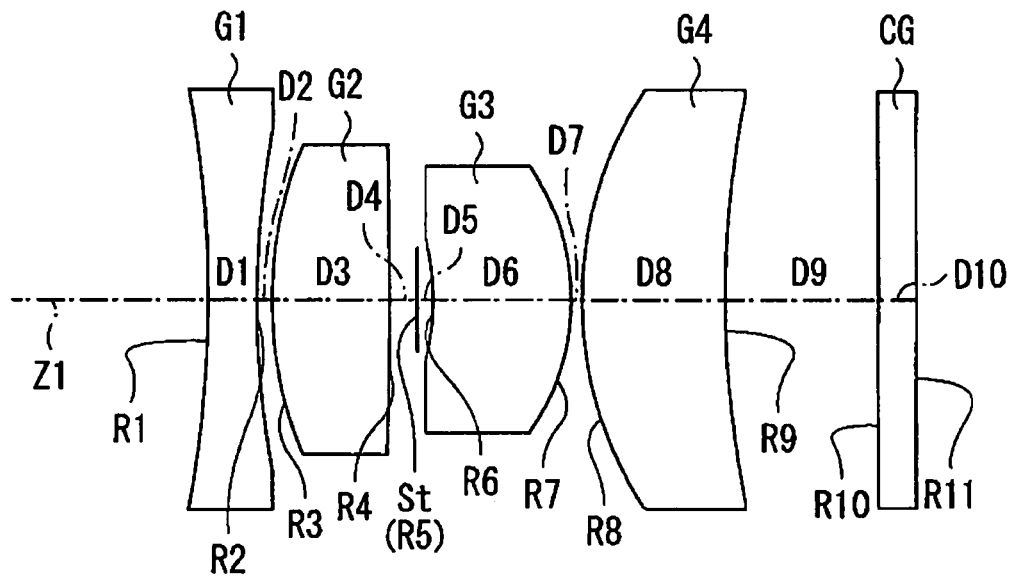
FIG. 1 is a cross-sectional view of a wide-angle imaging lens according to example 1 of the present invention.

One embodiment of the present invention will now be described in detail while referring to the drawings.

Figure 2:
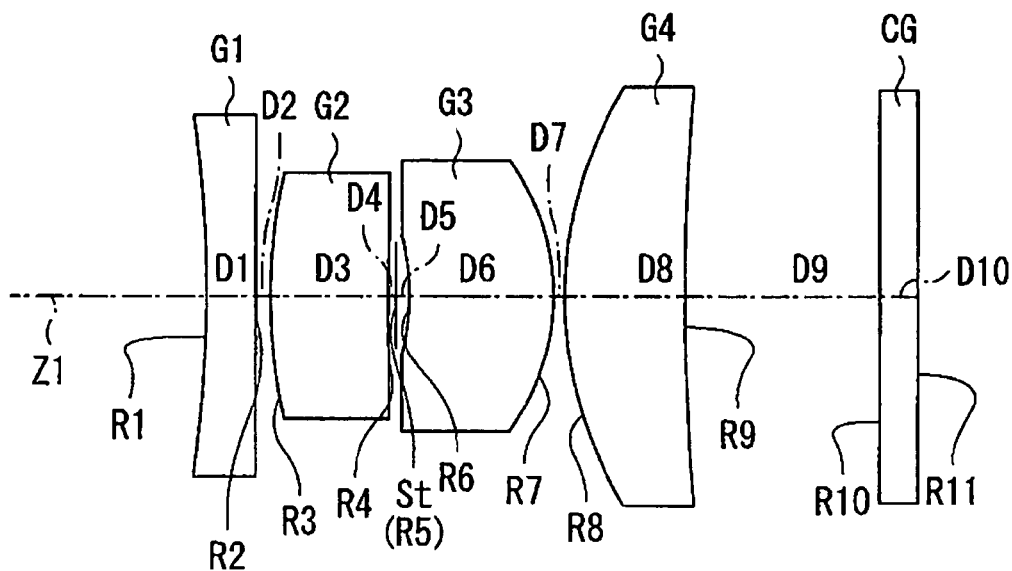
FIG. 2 is a cross-sectional view of a wide-angle imaging lens according to example 5 of the present invention.
Figures 3, 4:
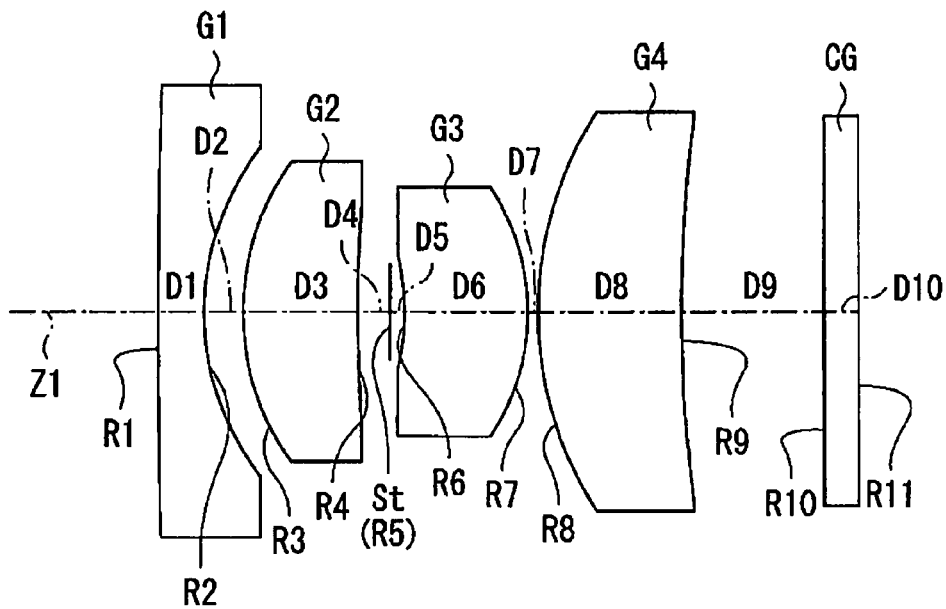
FIG. 3 is a cross-sectional view of a wide-angle imaging lens according to example 10 of the present invention.
FIG. 4 is a table showing basic lens data for the wide-angle imaging lens according to example 1 of the present invention.

FIGS. 1 to 3 are first to third arrangement examples for a wide-angle imaging lens according to the embodiment of the present invention. In FIGS. 1 to 3, Ri denotes the radius of the curvature of the i-th component surface (i=1 to 11) in a case wherein the surface of a component that is located nearest an object of all the components, including an optical diaphragm St, is defined as the first surface, and the number is gradually incremented toward the image (image forming side). Di denotes a surface space on the light axis between the i-th surface and the (i+1)-th surface.

This wide-angle imaging lens is appropriately mounted on an image pickup apparatus that employs an image sensor such as a CCD or a CMOS, and is especially appropriate for mounting on a vehicular camera or a monitoring camera, and comprises a first lens G1, a second lens G2, an aperture diaphragm St, a third lens G3 and a fourth lens G4 that are arranged along a light axis Z1, in order, near an object. An image sensor (not shown), such as a CCD or a CMOS, is arranged on an imaging surface. Further, depending on the structure of a camera on which the lens is mounted, a flat optical member CG, such as a glass cover or an infrared cut filter, for protecting an imaging surface, is arranged between the fourth lens G4 and the image sensor.

The first lens G1 has negative a refractive power. For the first lens G1, a double concave shape is employed in the first arrangement example; a negative meniscus shape with a concave face directed to the object is employed in the second arrangement example; and a negative meniscus shape with a convex face directed to the object is employed in the third arrangement example. The second lens G2 has a positive refractive power. For the second lens G2, a double convex shape is employed in the first arrangement example; and a positive meniscus shape with a convex face directed to the object is employed in the second and third arrangement examples.

The third lens G3 has a positive refractive power. It is preferable that the third lens G3 has a positive meniscus shape with a concave face directed to the object. The fourth lens G4 has a positive refractive power. It is preferable that the fourth lens G4 has a positive meniscus shape with a convex face directed to the object.

The wide-angle imaging lens satisfies the following conditional expressions. It should be noted that N2 denotes the refractive index of the second lens G2 at the d-line, N3 denotes the refractive index of the third lens G3 at the d-line, and N4 denotes the refractive index of the fourth lens G4 at the d-line.

$$N2 \geq 1.7 \quad (1)$$

$$N3 \geq 1.7 \quad (2)$$

$$N4 \geq 1.7 \quad (3)$$

Further, for the wide-angle imaging lens, it is preferable that the first lens G1, the second lens G2, the third lens G3 and the fourth lens G4 all be made of glass. Further, when an inexpensive arrangement is provided, it is especially preferable that spherical glass lenses be employed for all the lenses.

It is preferable that the wide-angle imaging lens satisfies the following conditional expression (4). It should be noted that D23 is a spatial distance between the second lens G2 and the third lens G3.

$$0.03 < D23/f < 0.22 \quad (4)$$

Further, it is preferable that the wide-angle imaging lens satisfies the following conditional expressions (5) to (7). It should be noted that f denotes the entire focal length of the imaging lens, f3 denotes the focal length of the third lens G3, f4 denotes the focal length of the fourth lens G4, and R1 denotes the radius of the curvature of the first lens G1 on the object side.

$$0.18 < f/f3 < 0.46 \quad (5)$$

$$0.27 < f/f4 < 0.58 \quad (6)$$

$$-0.44 < f/R1 < 0.11 \quad (7)$$

The operation of the wide-angle imaging lens having the above arrangement, and the effects provided by this lens, will be described.

For this wide-angle imaging lens, only a comparatively small number of lenses, i.e., with a four-component, four-element construction, are employed to optimize the entire power arrangement and the lens material, and downsizing and an increase in the angle of view can be accomplished. Since the first lens G1 located nearest the object has a negative refractive power, this is an especially favorable arrangement for increasing the angle of view. Further, since the second lens G2, the third lens G3 and the fourth lens G4 have positive refractive power, the overall length of the lens can be reduced, and the apparatus can be downsized. Furthermore, since a positive meniscus lens with a convex face directed to the image side is employed as the third lens G3, and a positive meniscus lens with a convex face directed to the object side is employed as the fourth lens G4, this arrangement is useful for the correction of individual aberrations, such as the curvature of a field.

When the wide-angle imaging lens satisfies conditional expressions (1) to (3), the lens material for the second lens G2, the third lens G3 and the fourth lens G4 is optimized, so that this is an appropriate arrangement for increasing the angle of view, and tends to be an inexpensive arrangement wherein spherical glass lenses are employed as the individual lenses. When the wide-angle imaging lens does not satisfy the conditional expressions (1) to (3), it is difficult, when spherical glass lenses are employed for all the lenses, for example, for downsizing and an increase in the angle of view to be accomplished at the same time. In this case, when glass lenses are employed for the first lens G1, the second lens G2, the third lens G3 and the fourth lens G4, this arrangement is especially preferable when the imaging lens is to be mounted on an image pickup apparatus, such as a vehicular camera. This is because when glass lenses are employed for all the lenses, compared with when plastic lenses are employed, focal point fluctuation, the deterioration of optical performance, or deformation due to an imposed load tend not to occur, even in an environment wherein there are sharp temperature changes during use or while stored. It should be noted that the face shape of the lens may be either a spherical face or an aspherical face, because a satisfactory performance can be obtained with either face shape. However, it is preferable that all the faces of the individual lenses be spherical, because this facilitates increased productivity and cost reductions.

In addition, when the wide-angle imaging lens satisfies conditional expression (4), the spatial distance between the second lens G2 and the third lens G3 is optimized, and this arrangement is appropriate not only for the correction of individual aberrations, but also for a reduction in the overall length of the lens. When the upper limit of conditional expression (4) is not satisfied, it is not preferable for the wide-angle imaging lens, because a correction for a comatic aberration will be insufficient, and when the lower limit of conditional expression (4) is not satisfied, it is also not preferable for the wide-angle imaging lens, because a correction for a spherical aberration will be insufficient.

When conditional expressions (5) to (7) are satisfied, the refractive power and shape of each lens can be optimized. Thus, all aberrations can be appropriately corrected, and downsizing and an increase in the angle of view can be more easily accomplished. Conditional expression (5) relates to the focal length of the third lens G3. When the upper limit of conditional expression (5) is not satisfied, a correction of a spherical aberration will be insufficient, and when the lower limit of conditional expression (5) is not satisfied, a correction for the curvature of a field will be insufficient. Conditional expression (6) relates to the focal length of the fourth lens G4. When the upper limit of conditional expression (6) is not satisfied, a correction for a distortion will be insufficient, and when the lower limit of conditional expression (6) is not satisfied, a correction for a comatic aberration will be insufficient. Conditional expression (7) relates to the radius of the curvature of the first lens G1. When the upper limit of conditional expression (7) is not satisfied, a correction for a spherical aberration will be insufficient, and when the lower limit of conditional expression (7) is not satisfied, a correction for the curvature of a field will be insufficient.

As described above, according to the wide-angle imaging lens of this embodiment, a comparatively small number of lenses, i.e., with a four-component, four-element construction, is employed to optimize the entire power arrangement and lens material. Therefore, by employing only a comparatively small number of lenses, the overall length of a lens can be reduced, and a large angle of view, equal to or greater than 90° (e.g., around 100°), can be obtained. As a result, an appropriate efficiency can be obtained for a lens that is mounted on a small, high-performance image pickup apparatus, especially a vehicular camera or a monitoring camera.

EXAMPLES

Examples 1 to 10 for providing numerical values for the wide-angle imaging lens of this embodiment will be summarized, while employing example 1 as a base.

As example 1, the basic lens data, correlated with the arrangement of the wide-angle imaging lens shown in FIG. 1, is shown in FIG. 4. A number provided for a surface of a component is entered in a surface number Si lens data column shown in FIG. 4. This number is gradually incremented toward an image, while the number for the surface of a component located nearest an object is defined as 1. A value (mm) for the curvature radius of the i-th component surface from the object is entered in a curvature radius Ri column, in consonance with Ri in FIG. 1. Likewise, space (mm) on the light axis between the i-th surface Si and the (i+1)-th surface Si+1 from the object is entered in surface space Di, in consonance with Di in FIG. 1. In a refractive index Ndj column, a refractive index is entered at d-line (wavelength 587.6 nm) of a j-th (j=1 to 5) optical element from the object. In a vdj column, an Abbe number is entered at the d-line of the j-th optical element from the object.

In the same manner as for example 1, the basic lens data for the wide-angle imaging lenses of examples 2 to 10 are shown in FIGS. 5 to 13. The lens data for example 5 shown in FIG. 8 correspond to the second arrangement example shown in FIG. 2. According to the wide-angle imaging lens for example 5, the first lens G1 has a negative meniscus shape with a concave face directed to the object, and the second lens G2 has a positive meniscus shape with a convex face directed to the object. The lens data for example 10 shown in FIG. 13 corresponds to the third arrangement example shown in FIG. 3. According to the wide-angle imaging lens for example 10, the first lens G1 has a negative meniscus shape with a convex face directed to the object, and the second lens G2 has a positive meniscus shape with a convex face directed to the object.

The basic arrangements of the wide-angle imaging lenses for the other examples (examples 2 to 4 and examples 6 to 9) are similar to the wide-angle imaging lens for example 1. It should be noted that in the wide-angle imaging lens in example 1 the second lens G2 has a double convex shape, and in the wide-angle imaging lenses in examples 3, 4, 6 and 7, the second lens G2 has a positive meniscus shape with a convex face directed to the object.

In all of examples 1 to 10, glass lenses are employed for the first lens G1, the second lens G2, the third lens G3 and the fourth lens G4, and all the surfaces are spherical shapes.

FIG. 15 is a table showing values for the individual examples that are related to the above described conditional expressions. FIG. 14 is a table showing the entire focal lengths f (mm) the F numbers (FNO.) and the view angles 2ω (°) of the individual examples. As shown in FIG. 15, the values of the examples fall within the individual conditional examples, and as shown in FIG. 14, a large angle of view of around 100° is obtained in the individual examples.

FIGS. 16A to 16C are diagrams showing individual aberrations for the wide-angle imaging lens in example 1. Specifically, a spherical aberration is shown in FIG. 16A, astigmatism is shown in FIG. 16B and distortion is shown in FIG. 16C. For these aberration graphs, the e-line (wavelength, 546.1 nm) is employed as a reference wavelength. In the spherical aberration graph, an aberration along the g-line (wavelength, 435.8 nm) and an aberration along the C-line (wavelength, 656.3 nm) are also shown. In the astigmatism graph, a solid line indicates an aberration in a sagittal direction, and a dotted line indicates an aberration in a tangential direction. FNO. represents an F number, and ω represents a half angle of the view.

Figure 21A:
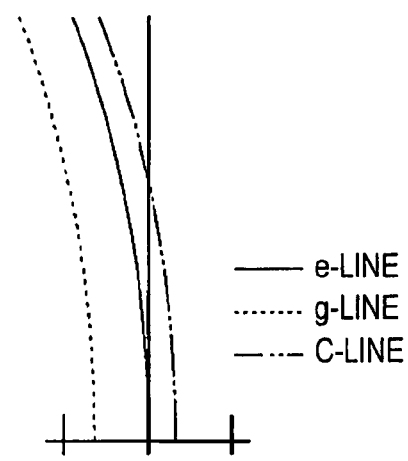
FIGS. 21A to 21C are graphs showing a spherical aberration, astigmatism and distortion, respectively, for the wide-angle imaging lens according to example 6 of the present invention.
Figure 21B:
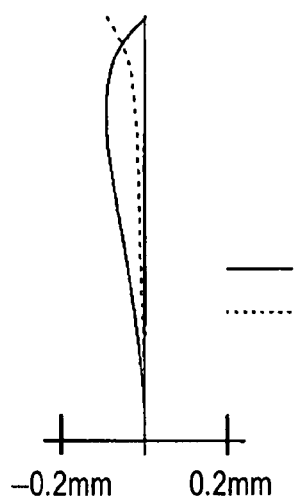
Figure 21C:
Figure 22A:
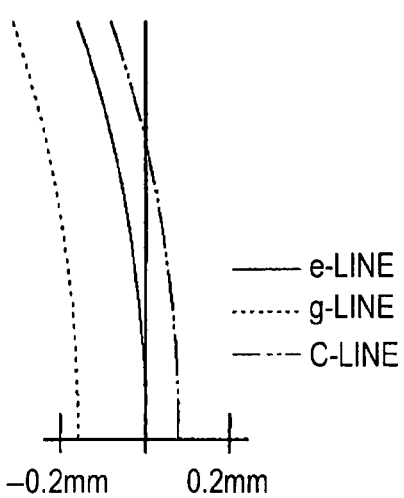
FIGS. 22A to 22C are graphs showing a spherical aberration, astigmatism and distortion, respectively, for the wide-angle imaging lens according to example 7 of the present invention.
Figure 22B:
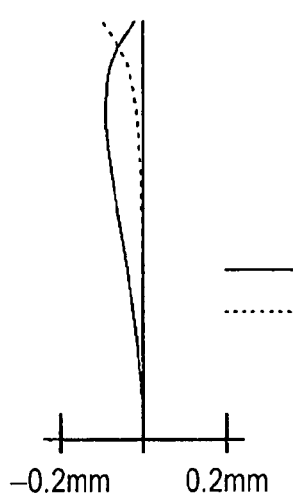
Figure 22C:
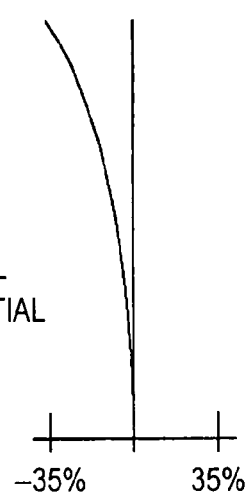
Figure 23A:
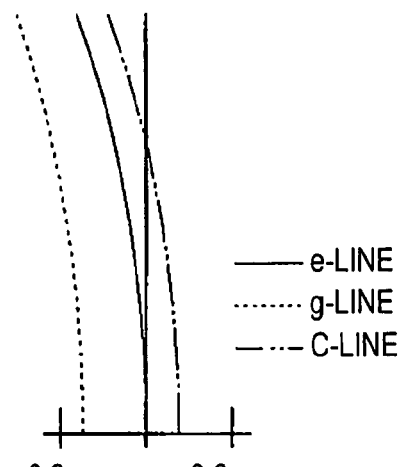
FIGS. 23A to 23C are graphs showing a spherical aberration, astigmatism and distortion, respectively, for the wide-angle imaging lens according to example 8 of the present invention.
Figure 23B:
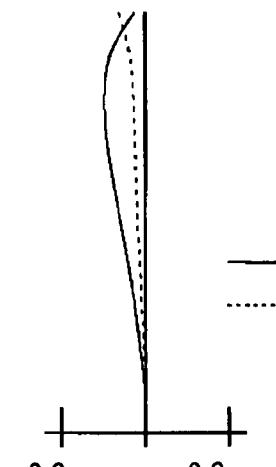
Figure 23C:
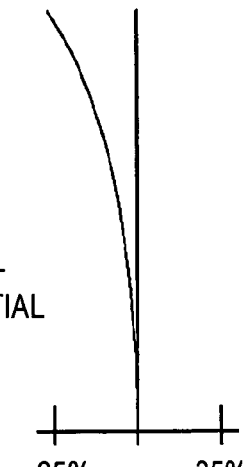
Figure 24A:
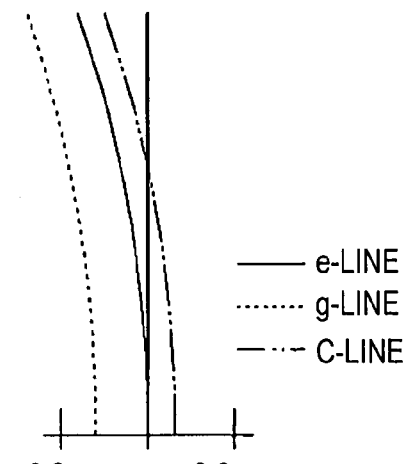
FIGS. 24A to 24C are graphs showing a spherical aberration, astigmatism and distortion, respectively, for the wide-angle imaging lens according to example 9 of the present invention.
Figure 24B:
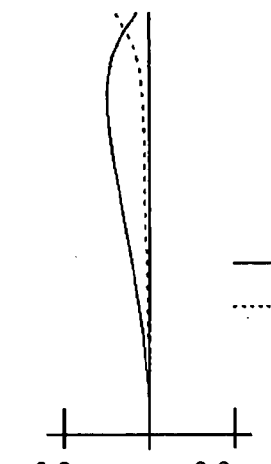
Figure 24C:
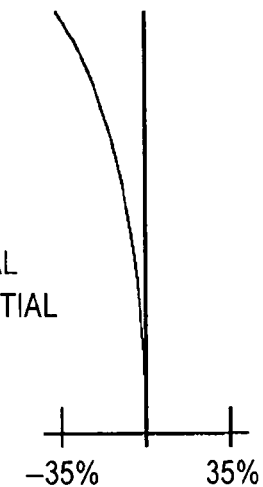
Figure 25A:
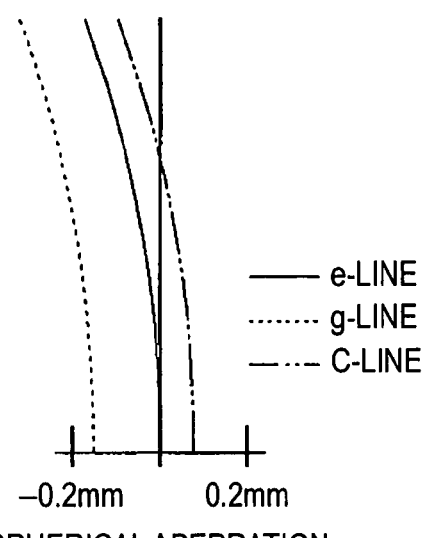
FIGS. 25A to 25C are graphs showing a spherical aberration, astigmatism and distortion, respectively, for the wide-angle imaging lens according to example 10 of the present invention.
Figure 25B:
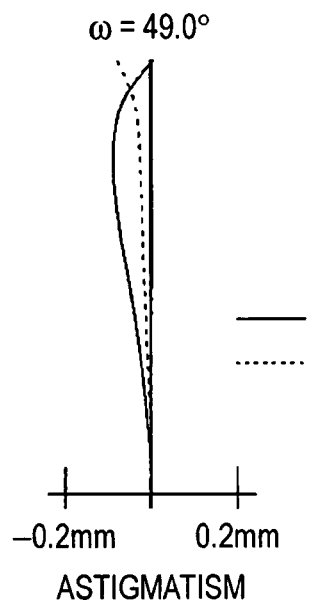
Figure 25C:
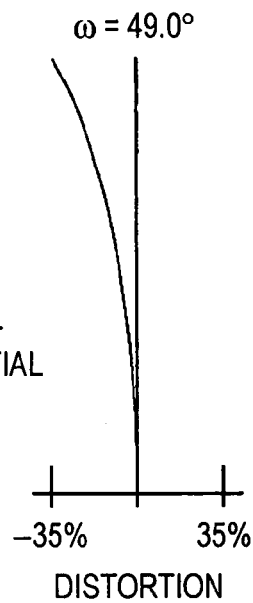

Likewise, individual aberrations for the wide-angle imaging lens for example 2 are shown in FIGS. 17A to 17C; aberrations for the wide-angle imaging lens for example 3 are shown in FIGS. 18A to 18C; aberrations for the wide-angle imaging lens for example 4 are shown in FIGS. 19A to 19C; aberrations for the wide-angle imaging lens for example 5 are shown in FIGS. 20A to 20C; aberrations for the wide-angle imaging lens for example 6 are shown in FIGS. 21A to 21C; aberrations for the wide-angle imaging lens for example 7 are shown in FIGS. 22A to 22C; aberrations for the wide-angle imaging lens for example 8 are shown in FIGS. 23A to 23C; aberrations for the wide-angle imaging lens for example 9 are shown in FIGS. 24A to 24C; and aberrations for the wide-angle imaging lens for example 10 are shown in FIGS. 25A to 25C.

As is apparent from the lens data and the aberration graphs, for the individual examples, the lens arrangement wherein four units are prepared using four lenses is employed to optimize the shapes and refractive powers of the lenses and the lens material. Thus, a small, high-performance wide-angle lens system, for which an angle of view of around 100° is ensured, can be provided.

The present invention is not limited to the embodiment and the examples described above, and can be variously modified. For example, the radius curvature R of each lens component, the surface space D between the lenses, and the refractive index N and the value of the Abbe number v are not limited to those shown in the examples given to provide numerical values, and other values can be provided.

According to the wide-angle imaging lens of this invention, only a comparatively small number of lenses, i.e., with a four-component, four-element construction, is employed to optimize the entire power arrangement and the lens material. Therefore, while using a comparatively small number of lenses, the overall length of the lens can be reduced, and a large angle of view, equal to or greater than 90°, can be obtained.

Especially when spherical glass lenses are employed for all the lenses, the price can be lowered, compared with when a molded, aspherical glass lens is employed, and the arrangement is adversely affected very little by temperature fluctuation during use and by storage environments. As a result, this arrangement provides appropriately efficient service when mounted on a vehicular camera or a monitoring camera.

The entire disclosure of each and every foreign patent application from which the benefit of foreign priority has been claimed in the present application is incorporated herein by reference, as if fully set forth.

What is claimed is:

1. A wide-angle imaging lens comprising, in order from an object:
   a first lens having a negative refractive power, the first lens being a double concave lens, or a negative meniscus shape with a concave face directed to the object, or a negative meniscus shape with a convex face directed to the object;
   a second lens having a positive refractive power with a convex face directed to the object;
   an aperture diaphragm;
   a third lens having a positive refractive power with a convex face directed to an image; and
   a fourth lens having a positive refractive power with a convex face directed to the object,
   wherein the following conditional expressions are satisfied, $$N2 \geq 1.7 \quad (1)$$
   $$N3 \geq 1.7 \quad (2)$$
   $$N4 \geq 1.7 \quad (3)$$

when
   N2: a refractive index of the second lens at the d-line
   N3: a refractive index of the third lens at the d-line
   N4: a refractive index of the fourth lens at the d-line.

2. A wide-angle imaging lens according to claim 1, wherein the third lens has a meniscus shape with a convex face directed to the image, and the fourth lens has a meniscus shape with a convex face directed to the object.

3. A wide-angle imaging lens according to claim 2, wherein the following conditional expression (4) is satisfied, $$0.03 < D23/f < 0.22 \quad (4)$$

when
   D23: a spatial distance between the second lens and the third lens.

4. A wide-angle imaging lens according to claim 3, wherein the following conditional expressions (5) to (7) are satisfied, $$0.18 < f/f3 < 0.46 \quad (5)$$
   $$0.27 < f/f4 < 0.58 \quad (6)$$
   $$-0.44 < f/R1 < 0.11 \quad (7)$$

when
   f: the entire focal length of the imaging lens
   f3: a focal length of the third lens
   f4: a focal length of the fourth lens
   R1: a radius of a curvature of the first lens on the object side.

5. A wide-angle imaging lens according to claim 4, wherein the first lens, the second lens, the third lens and the fourth lens all are glass lenses.

6. A wide-angle imaging lens according to claim 3, wherein the first lens, the second lens, the third lens and the fourth lens all are glass lenses.

7. A wide-angle imaging lens according to claim 2, wherein the following conditional expressions (5) to (7) are satisfied, $$0.18 < f/f3 < 0.46 \quad (5)$$
   $$0.27 < f/f4 < 0.58 \quad (6)$$
   $$-0.44 < f/R1 < 0.11 \quad (7)$$

when
   f: the entire focal length of the imaging lens
   f3: a focal length of the third lens
   f4: a focal length of the fourth lens
   R1: a radius of a curvature of the first lens on the object side.

8. A wide-angle imaging lens according to claim 7, wherein the first lens, the second lens, the third lens and the fourth lens all are glass lenses.

9. A wide-angle imaging lens according to claim 2, wherein the first lens, the second lens, the third lens and the fourth lens all are glass lenses.

10. A wide-angle imaging lens according to claim 1, wherein the following conditional expression (4) is satisfied, $$0.03 < D23/f < 0.22 \quad (4)$$

when
    D23: a spatial distance between the second lens and the third lens.

11. A wide-angle imaging lens according to claim 10, wherein the following conditional expressions (5) to (7) are satisfied, $$0.18 < f/f3 < 0.46 \quad (5)$$
    $$0.27 < f/f4 < 0.58 \quad (6)$$
    $$-0.44 < f/R1 < 0.11 \quad (7)$$

when
    f: the entire focal length of the imaging lens
    f3: a focal length of the third lens
    f4: a focal length of the fourth lens
    R1: a radius of a curvature of the first lens on the object side.

12. A wide-angle imaging lens according to claim 11, wherein the first lens, the second lens, the third lens and the fourth lens all are glass lenses.

13. A wide-angle imaging lens according to claim 10, wherein the first lens, the second lens, the third lens and the fourth lens all are glass lenses.

14. A wide-angle imaging lens according to claim 1, wherein the following conditional expressions (5) to (7) are satisfied, $$0.18 < f/f3 < 0.46 \quad (5)$$
    $$0.27 < f/f4 < 0.58 \quad (6)$$
    $$-0.44 < f/R1 < 0.11 \quad (7)$$

when
    f: the entire focal length of the imaging lens
    f3: a focal length of the third lens
    f4: a focal length of the fourth lens
    R1: a radius of a curvature of the first lens on the object side.

15. A wide-angle imaging lens according to claim 14, wherein the first lens, the second lens, the third lens and the fourth lens all are glass lenses.

16. A wide-angle imaging lens according to claim 1, wherein the first lens, the second lens, the third lens and the fourth lens all are glass lenses.

* * * * *